United States Patent
Voronkov et al.

(10) Patent No.: US 9,182,974 B1
(45) Date of Patent: Nov. 10, 2015

(54) SYSTEM AND METHODS FOR UPDATING SOFTWARE OF TEMPLATES OF VIRTUAL MACHINES

(71) Applicant: Kaspersky Lab ZAO, Moscow (RU)

(72) Inventors: Konstantin P. Voronkov, Moscow (RU); Stepan N. Deshevykh, Moscow (RU); Timur E. Smirnov, Moscow (RU); Nikita M. Voitov, Moscow (RU); Pavel N. Yarykin, Moscow (RU)

(73) Assignee: AO Kaspersky Lab, Moscow (RU)

( * ) Notice: Subject to any disclaimer, the term of this patent is extended or adjusted under 35 U.S.C. 154(b) by 0 days.

(21) Appl. No.: 14/308,027

(22) Filed: Jun. 18, 2014

(30) Foreign Application Priority Data

Apr. 18, 2014 (RU) ................................ 2014115455

(51) Int. Cl.
*G06F 9/445* (2006.01)
*G06F 9/455* (2006.01)
*G06F 11/14* (2006.01)
*G06F 9/44* (2006.01)

(52) U.S. Cl.
CPC .............. *G06F 8/65* (2013.01); *G06F 9/45504* (2013.01); *G06F 11/1433* (2013.01)

(58) Field of Classification Search
CPC ...... G06F 8/63; G06F 8/65; G06F 8/67–8/68; G06F 9/45504; G06F 9/45533; G06F 9/45558; G06F 11/1433
USPC .............................................. 717/168; 14/168
See application file for complete search history.

(56) References Cited

U.S. PATENT DOCUMENTS

| 8,185,884 | B2 | 5/2012 | Sudhakar | |
| 8,205,194 | B2* | 6/2012 | Fries et al. | 717/168 |
| 8,578,376 | B2 | 11/2013 | Natchadalingam et al. | |
| 8,769,519 | B2* | 7/2014 | Leitman et al. | 717/168 |
| 2002/0184619 | A1* | 12/2002 | Meyerson | 717/173 |
| 2008/0222638 | A1* | 9/2008 | Beaty et al. | 718/100 |
| 2012/0144489 | A1 | 6/2012 | Jarrett et al. | |
| 2013/0042234 | A1* | 2/2013 | DeLuca et al. | 718/1 |

(Continued)

FOREIGN PATENT DOCUMENTS

| EP | 2530589 A2 | 12/2012 |
| RU | 2498394 A | 6/2012 |
| WO | 2012065815 A1 | 5/2012 |

OTHER PUBLICATIONS

Grobauer et al., "Understanding Cloud Computing Vulnerabilities," IEEE, 2011, 8pg.*

(Continued)

*Primary Examiner* — Ryan Coyer
(74) *Attorney, Agent, or Firm* — Arent Fox LLP; Michael Fainberg (57) ABSTRACT

Disclosed are systems, methods and computer readable medium for updating software of templates of virtual machines. An example method includes determining a first coefficient indicative of a level of importance of a continuous operation of one or more virtual machines created from a virtual machine template; determining a second coefficient indicative of a level of criticality of software updates on the one or more virtual machines created from the virtual machine template; determining a third coefficient as a function of the first coefficient and the second coefficient; and when the third coefficient exceeds a threshold, updating the software on the virtual machine template to generate an updated virtual machine template.

20 Claims, 5 Drawing Sheets

(56) References Cited

U.S. PATENT DOCUMENTS

| | | | |
|---|---|---|---|
| 2013/0074072 A1* | 3/2013 | Kennedy | 718/1 |
| 2014/0149696 A1* | 5/2014 | Frenkel et al. | 711/162 |
| 2014/0157266 A1* | 6/2014 | Fletcher et al. | 718/1 |
| 2014/0325363 A1* | 10/2014 | Fletcher et al. | 715/736 |
| 2014/0344805 A1* | 11/2014 | Shu et al. | 718/1 |

OTHER PUBLICATIONS

Wang et al., "Rethink the Virtual Machine Template," ACM, 2011, 11pg.*

* cited by examiner

SYSTEM AND METHODS FOR UPDATING SOFTWARE OF TEMPLATES OF VIRTUAL MACHINES

CROSS-REFERENCE TO RELATED APPLICATIONS

The present disclosure claims benefit of priority under 35 U.S.C. 119(a)-(d) to a Russian Application No. 2014115455 filed on Apr. 18,2014, which is incorporated by reference herein.

FIELD OF TECHNOLOGY

The present disclosure relates to the field of control of virtual machines, and more specifically, to systems and methods for updating software of templates of virtual machines.

BACKGROUND

Today the use of Virtual Desktop Infrastructure (VDI), which generally includes a set of templates of virtual machines and means that allow the operation of virtual machines created from those templates, is becoming increasingly popular as the basis for forming an enterprise or organizational infrastructure. Such a method of infrastructure organization is attractive because of the ease of managing the infrastructure resources: at least one server is dedicated, whose hardware is used for the operation of a group of virtual machines, which are used remotely by the employees of the organization. In other words, the computing resources are "concentrated" in a single place, while the control of the software used by the employees of the organization occurs via the control of the templates, which eliminates the need for determining a set of software to be used for each employee.

However, the aforementioned method of infrastructure organization has a number of drawbacks. For example, the software installed on the virtual machines and used by the employees of the enterprise can become obsolete and vulnerabilities may be discovered therein. On the one hand, the operation of a virtual machine is in no way different in regard to the general ability to install software updates or updates to close vulnerabilities, that is, for example, the software vulnerabilities can be eliminated by installing corresponding software updates on a virtual machine created from a template that is vulnerable in terms of the software installed thereon. However, the problem arises that after a certain time, the software on the template becomes so outdate that the installation of all necessary updates on the virtual machine created from the template takes a lot of time and computing resources There are conventional methods of automatic updating of the software of templates, but in these methods the problem of selecting an update strategy which can effectively manage a set of virtual machines and templates, minimizing the time during which the software being updated is unavailable for use, is not solved. Accordingly, there is an unmet need in the field of control of virtual machines to improve the processes of updating software of templates of virtual machines.

SUMMARY

Disclosed are various aspects of systems, methods and computer program products for automatic updating software of templates of virtual machines. One technical result of the disclosed aspects is to minimize the idle time of the virtual machine for updating of software.

In one aspect, an example method for updating software of templates of virtual machines includes determining a first coefficient indicative of a level of importance of a continuous operation of one or more virtual machines created from a virtual machine template; determining a second coefficient indicative of a level of criticality of software updates on the one or more virtual machines created from the virtual machine template; determining a third coefficient as a function of the first coefficient and the second coefficient; and when the third coefficient exceeds a threshold, updating the software on the virtual machine template to generate an updated virtual machine template.

In another aspect, the method may further include determining, based on an analysis of critical events occurring during a period of operation of a test virtual machine created from the updated virtual machine template, whether the updated virtual machine template is suitable for being used for one or more virtual machines, and when the updated virtual machine template is suitable: creating a new virtual machine from the updated virtual machine template; shutting down the one or more virtual machine; and running the new virtual machine to replace the one or more virtual machines.

In another aspect, the method may further include providing a database of software updates storing one or more of: at least one software update for updating of the virtual machine; data about a creation time of the software update; data about a version of the software update; data about software for which the software update is intended; data about vulnerabilities which are patched by the software update; data about a level of criticality of the software update; and data indicating a nature of changes made in the software by the update.

In another aspect, the third coefficient is one of a linear function of the first coefficient and the second coefficient; and a product of the first coefficient weighted by a first index and the second coefficient weighted by a second index.

In another aspect, updating the software on the virtual machine template may further include generating a dummy virtual machine based on the virtual machine template; applying the software update to the software of the dummy virtual machine; shutting down the dummy virtual machine; and creating an image corresponding to the dummy virtual machine.

In another aspect, updating the software on the virtual machine template may further include applying the software update to the software of the virtual machine template.

In another aspect, determining the first coefficient may include, based on a software evaluation table in which a weighting factor is established for each software program, determining weighting factors for installed software on the virtual machine template; and calculating the first coefficient as a function of the weighting factors.

In another aspect, determining the first coefficient may be performed based on recorded length of continuous operation of the virtual machine.

In another aspect, determining the second coefficient may further include determining one or more characteristics of the software update and respective coefficients for the one or more characteristics; and determining the second coefficient as a function of the respective coefficients.

In another aspect, an example system for updating software of templates of virtual machines, the system comprising a processor configure to determine a first coefficient indicative of a level of importance of a continuous operation of one or more virtual machines created from a virtual machine template; determine a second coefficient indicative of a level of criticality of software updates on the one or more virtual machines created from the virtual machine template; determine a third coefficient as a function of the first coefficient and the second coefficient; and when the third coefficient exceeds a threshold, update the software on the virtual machine template to generate an updated virtual machine template.

In a further aspect, an example computer program product, stored on a non-transitory computer-readable storage medium, comprises computer-executable instructions for updating software of templates of virtual machines, including instructions for determining a first coefficient indicative of a level of importance of a continuous operation of one or more virtual machines created from a virtual machine template; determining a second coefficient indicative of a level of criticality of software updates on the one or more virtual machines created from the virtual machine template; determining a third coefficient as a function of the first coefficient and the second coefficient; and when the third coefficient exceeds a threshold, updating the software on the virtual machine template to generate an updated virtual machine template.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects simplified form as prelude to the more detailed description of the disclosure that follows.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects are described herein in the context of a system, method and computer program product for updating software of templates of virtual machines. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Some example aspects update software of templates of virtual machines by considering a level of importance of continuous operation of virtual machines that use the template and also a level of criticality of applying software updates to the templates. Some further aspects determine whether the updated template is suitable to be used for the virtual machines and reboot the virtual machines accordingly. Accordingly, updates may be performed on the basis of an analysis of a number of characteristics of both the set of software updates and the template of the virtual machine whose software is intended to be updated, or the virtual machines created from the aforementioned template of the virtual machine.

Figure 1:
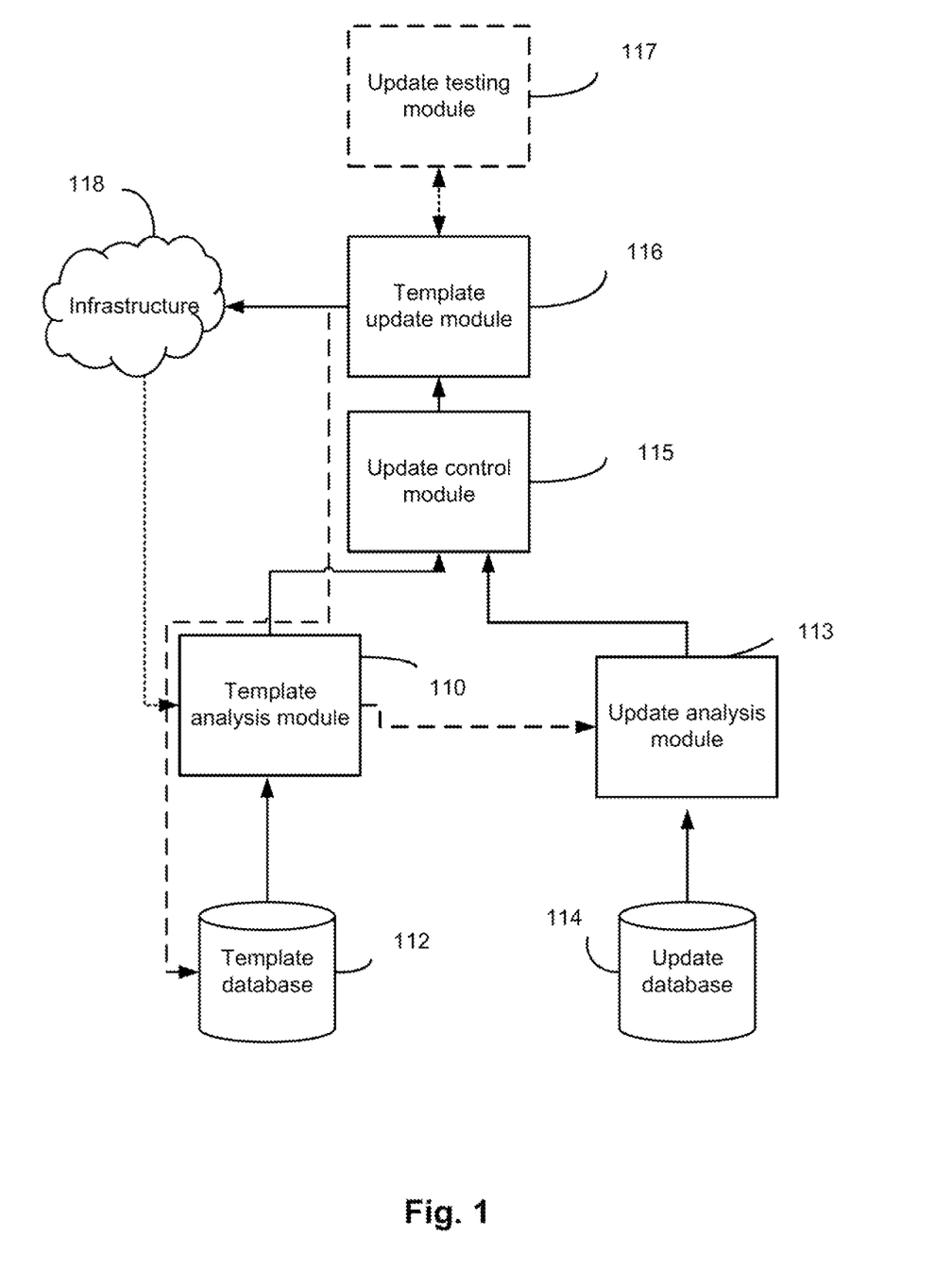
FIG. 1 illustrates the structural diagram of an example system for updating software of templates of virtual machines according to one example aspect.

FIG. 1 shows the structural diagram of an example aspect of a system for running a virtual machine. The infrastructure 118 of a certain organization in one example aspect includes a server, on which a set of virtual machines run, access to which is provided remotely by computing devices which are used by the employees of the organization. The virtual machines operating in the framework of the infrastructure 118 may be created from templates of virtual machines. In one example aspect, the template of a virtual machine may be an image of the virtual machine storing information about the operating system installed on the virtual machine, the software, and the hardware set which is accessible for use by the virtual machine, which is used to create virtual machines that are identical with the virtual machine described by the aforesaid image. For the storage of the templates of virtual machines, which can be used in the infrastructure 118 of the organization, a template database 112 is used. In one example aspect, the template database 112 may additionally store information on the software installed on the template of the virtual machine. In yet another example aspect, the template database 112 for each template of a virtual machine additionally stores information on the virtual machines created from it and used in the infrastructure 118. The group of templates of virtual machines used in the infrastructure 118 of the organization may include templates of virtual machines used for different purposes, e.g., from virtual machines playing the role of servers to virtual machines used by accountants or employees of the human resources department of the organization. Thus, the software running on the templates of the virtual machines used in the infrastructure 118, and also the time of continuous working of the virtual machines created from the mentioned templates, may vary. For example, a virtual machine playing the role of an email server, and which may run an e-mail server software, may operate without interruption over the course of several months, while a virtual machine used by the accountants, and which may run an accounting software, may be restarted each day.

The templates of the virtual machines stored in the template database 112 for a time meet the needs of the infrastructure 118, for example, up-to-date software (in the sense of no vulnerabilities and meeting the needs of the employees of the organization) is installed on the templates of the virtual machines. After some time passes, the software installed on the template may become outdated, for example, vulnerabilities may appear in it, which can be used by hackers, and also the software may simply cease meeting the possibly increasing needs of the company employees (for example, a company employee using software, such as an email client, now needs to filter unwanted emails, which cannot be done with the existing software functionality). To solve this situation, sonic example aspects update the software on the templates of the virtual machines so that each virtual machine created from a template already has a set of updated software, and the users of the virtual machines do not have to spend their time updating the software on the virtual machines they are using. To update the software of the templates of the virtual machines, software updates may be used that are stored in an update database 114. In one example aspect, the database 114 may be filled up regularly as new software updates appear for downloading via the Internet. The software updates may include, but not limited to new program files, data used by the software, e.g., virus definitions, or instructions for changing the existing software files, e.g., software patches, etc. Besides software updates, in one example aspect, the following information may be stored in the update database 114: the creation time of the software update; the software for which the mentioned update is intended; the version of the software update; the names of the vulnerabilities which are patched by installing the software update, if such exist (for example, CVE-2013-0422); the level of criticality of the update, which in one example aspect is established by the creators of the software update and evaluated by a number, the type of update, e.g., the nature of the changes made in the software, such as elimination of a vulnerability, and/or changing an interface, and/or changing a software functionality, which in one example aspect may be indicated by the developer of the software update.

Figure 2:
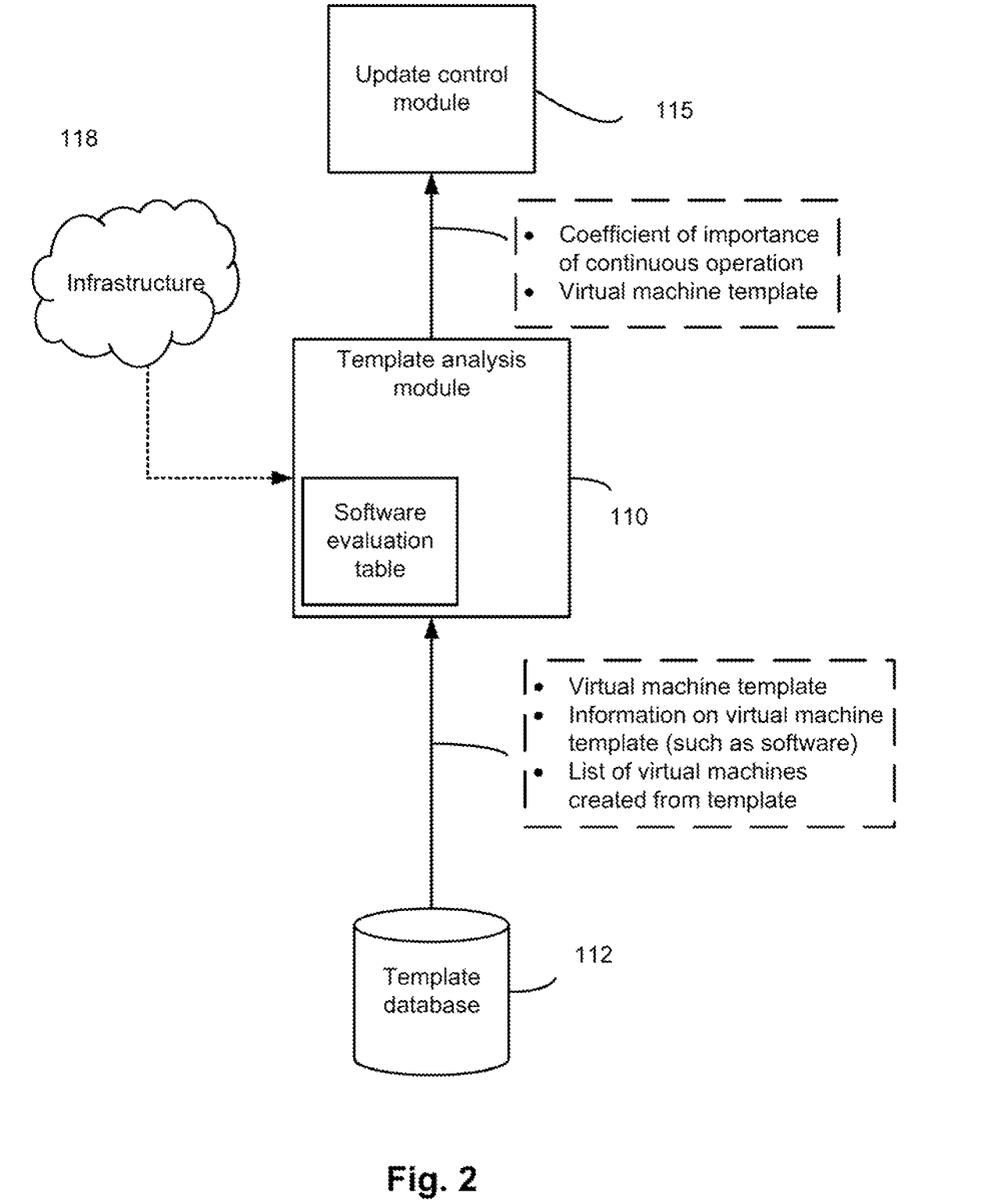
FIG. 2 illustrates one example aspect of a template analysis module according to one example aspect.

In one example aspect, updating of the virtual machines of the infrastructure 118 (e.g., updating of the software of the virtual machines) performing various roles, may be performed as follows: update the software of the corresponding templates of the virtual machines, stop operation of said virtual machines, and start each from the template of the virtual machine with the updated software. Some example aspects for updating virtual machines minimize the number of shutdowns (or standstill time) during operation of those virtual machines for which a continuous operation is critical (for example, if the virtual machine is playing the role of an email server, or a database server). The template of a virtual machine may be characterized by a coefficient of importance of continuous operation, which is used to evaluate the criticality of the continuous running of the virtual machines created from the mentioned template. Coefficient of importance of continuous operation may be a number (such as 10.75), the larger the value of which, the more important its continuous operation for the virtual machine (created from the template to which the mentioned coefficient pertains). To evaluate the criticality of continuous operation of at least one virtual machine created from the template of the virtual machine and, accordingly, designate a coefficient of importance of continuous operation for the template of the virtual machine, a template analysis module 110 is used. The template analysis module 110 uses the template of the virtual machine from the template database 112 to evaluate this template and to calculate a coefficient of importance of continuous operation corresponding to this template. One example working scheme of the template analysis module 110 is shown in FIG. 2, which will be described later.

Figure 3:
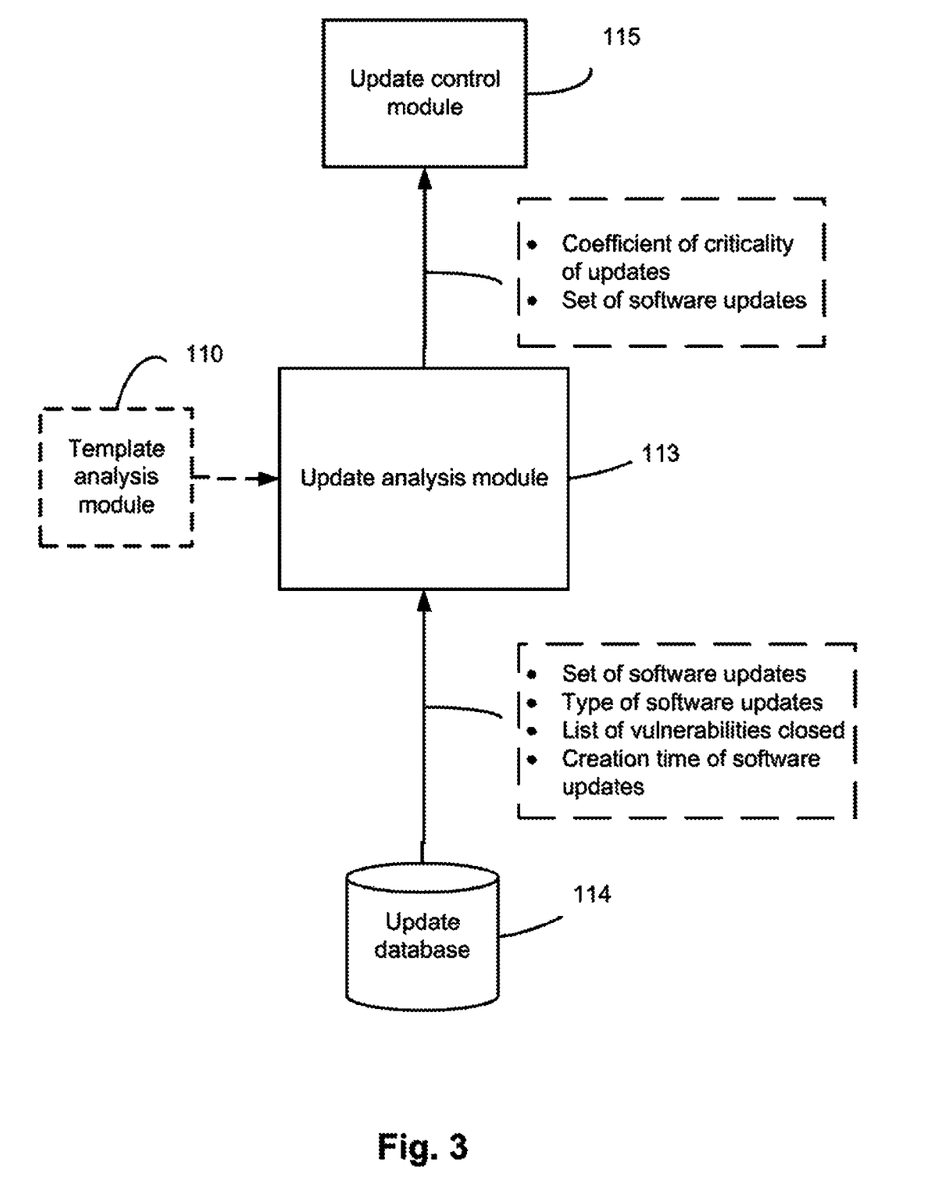
FIG. 3 illustrates one example aspect of an update analysis module according to one example aspect.

The software updates stored in the update database 114 may be intended for different purposes: some of the software updates may be intended to expand the existing software functionality, while others may be intended to eliminate vulnerabilities in the software. Depending on the software changes which are introduced by the software updates, the need may vary to interrupt the operation of the virtual machines from the infrastructure 118 in order to start their updated versions and, consequently, install the software updates on the corresponding templates of the virtual machines. To evaluate the need to install software updates on a template, a coefficient of criticality of updates is used. Coefficient of criticality of updates may be a number (such as 20.34), the larger the value of which, the more important the software update to the operation of the software. To evaluate the importance of installing a set of software updates on a template of a virtual machine and, consequently, designating a coefficient of criticality of the update for a set of software updates, an update analysis module 113 is used. The update analysis module 113 uses the set of software updates from the update database 114 to evaluate the set of said updates and to calculate a coefficient of criticality of updates corresponding to the analyzed set of software updates. One example working scheme of the update analysis module 113 is shown in FIG. 3, which will be described later.

An update control module 115 is designed to make a decision on updating the software of the template of a virtual machine. The decision as to the need to install a set of software updates on the template of a virtual machine is made on the basis of an analysis of a number of characteristics of both the set of software updates and the template of the virtual machine whose software is intended to be updated, or the virtual machines created from the aforementioned template of the virtual machine. In one example aspect, one uses as such characteristics the coefficient of importance of continuous operation, which is determined by the template analysis module 110, and also the coefficient of criticality of updates, which is determined by the update analysis module 113. In one example aspect, the update control module 115 evaluates the aforementioned characteristics of the set of software updates and the template of the virtual machine or the virtual machines created from that template by comparing a combination of coefficients, in one example aspect those obtained from the template analysis module 110 and update analysis module 113, with an established value, which is a number, such as 43.5. In one example aspect, the combination used is a linear combination of the aforementioned coefficients, for example, the difference between the coefficient of importance of continuous working and the coefficient of criticality of updates. In another example aspect, the combination used is the product of the coefficients, each of which has its own index, for example the product of the coefficient of importance of continuous working with index "−1" and that of the coefficient of criticality of updates with index "1". The obtained combination of coefficients is compared with the established value; in one example aspect the update control module 115 makes a decision as to the need for updating the software installed on the template of the virtual machine if the combination of coefficients exceeds a value of, for example, 1.5. The value with which the combination of coefficients is compared in one example aspect reflects how much more important it is to install the updates than for the virtual machines created from the template of the virtual machine to run continuous, and in one example aspect it is established by empirical values. Besides the coefficient of importance of continuous working from the template analysis module 110, the update control module 115 obtains the template of the virtual machine that was used by the template analysis module 110 to calculate the coefficient of importance of continuous operation. Besides the coefficient of criticality of updates from the update analysis module 113, the update control module 115 obtains the template of the set of software updates that was used by the update analysis module 113 to calculate the coefficient of criticality of updates. The virtual machine template and set of software updates obtained by the above-described methods are sent by the update control module 115, along with a decision as to the need for updating the software of the template of the virtual machine, to a template update module 116.

The template update module 116 is configured to update the template of the virtual machine. Updating the template of the virtual machine refers to updating the software of the template of the virtual machine. In one example aspect, when updating the software of the template of a virtual machine, the template update module 116 creates a virtual machine from the aforementioned template, and in the context of its operation the installed software is subjected to updating with the use of the set of software updates. From the virtual machine with updated software, the template update module 116 creates the template of the virtual machine with updated software. The template of the virtual machine is created from the virtual machine by shutting it down and creating an image corresponding to the aforementioned virtual machine. The image includes data necessary for running of the virtual machine. In another example aspect, the template update module 116 does not run a virtual machine from the template of the virtual machine intended for updating. Instead, the modification in the software which is performed in accordance with the installation of the set of software updates is implemented directly in the template of the virtual machine. In one example aspect, the template of the virtual machine is connected to a computing device (such as a personal computer) or another virtual machine as an external disk. The changes that are made in the software during the installation of the updates are made in the software installed on the connected external disk by the template update module 116. If the software updates include any instructions for changing the software being updated, these instructions are carried out by the template update module 116. An example of such instructions may be SFX (Self-Extract Archive) instructions: "Delete=***.dll", "Path=C:\", the first of which deletes a certain file of the dynamic library dll, while the second specifies a directory for copying files from the sfx archive of type "C:\".

The template update module 116, using information from the database on the virtual machines operating within the infrastructure 118 that were created from the template of the virtual machine that was updated by the template update module 116, shuts down the virtual machines previously created from the template of the virtual machine and runs the new virtual machines from the updated template of the virtual machine for operation within the infrastructure 118 in place of the ones shut down.

In one example aspect, the template update module 116, after updating the template of the virtual machine, saves that template of the virtual machine along with information on the versions of the updated software in the template database 112.

In one example aspect, an update testing module 117 may be used to analyze the operation of the software on the virtual machine. In one example aspect, the update testing module 117 is used to detect updated templates of virtual machines on which the software (including the updated software) has unstable operation (for example, the performance of certain tasks has errors when the updated software is run) or can adversely affect the operation of the virtual machines and other software (for example, become a cause of incorrect execution of tasks of other software). To detect critical events occurring during the operation of the virtual machine and reflecting unstable operation of the software, the update testing module 117 analyzes the operation of the virtual machine over the course of a period of time (e.g., 10 hours). During the analysis, the update testing module 117 collects information on critical events occurring in the course of the operation of the virtual machine created from the template updated with the aid of the template update module 116. If critical events are found, the update testing module 117 sends a corresponding message to the template update module 116. After obtaining such a message, the template update module 116 classifies the template of the virtual machine from which the analyzed virtual machine was created as being unsuitable for further use in the infrastructure 118, and accordingly the restarting of the virtual machines with the use of this virtual machine template is not carried out. In one example aspect, the template update module 116 also does not send this virtual machine template for storage in the template database 112. Critical events occurring in the course of operation of the analyzed virtual machine, in one example aspect, may be a degradation in productivity of the virtual machine (including due to a competition for the resources of the virtual machine among the software running thereon) or errors in the operation of the operating system of the virtual machine. In one example aspect, critical events involving degraded productivity may be found by a periodic checking (at established intervals of time, such as every 10 minutes) of the utilization of resources of the virtual machine: if the workload or the consumption of resources (such as the central processing unit of the virtual machine or the main memory of that virtual machine) is constantly increasing, the update testing module 117 finds a critical event. In yet another example aspect, errors in the operation of the operating system of the virtual machine may be found by going to the Windows operating system component known as Event Viewer, which makes it possible to obtain a list of events occurring during the operation of the operating system, and to classify as critical events those events on the list having the attribute "Level" with the value "Error" and the attribute "Source" with a value containing the name of the process corresponding to the updated software.

FIG. 2 shows a flow chart of an example aspect of the operation of the template analysis module 110. In some aspects, the template analysis module 110 is configured to calculate the coefficient of importance of continuous operation of the virtual machine template, and also to transmit this coefficient, along with the virtual machine template to which the coefficient pertains, to the update control module 115. The determination of the coefficient of importance of continuous operation of the virtual machine template involves evaluating the need to interrupt the running of the virtual machines operating in the infrastructure 118 that were created from the virtual machine template. In one example aspect, this evaluation may be done by comparing the software installed on the virtual machine template and a list of software from a software evaluation table in which a weighting factor (e.g., a number, such as 5.6) is established for each software program; the higher the number, the more important the continuous operation of the software associated therewith. In one example aspect, this table is stored in the template evaluation module 110. In another example aspect, this table is stored in a specially designed software database. In one example aspect, the coefficient of importance of continuous operation for the virtual machine template is calculated by adding up the weighting factors of the installed software in accordance with the values from the software evaluation table. In another example aspect, the coefficient of importance of continuous operation is calculated by taking the square root of the sum of the squares of the weighting factors of the installed software in accordance with the values from the software evaluation table.

In yet another example aspect, during the calculation of the coefficient of importance of continuous operation of the virtual machine template by the template analysis module 110, the module 110 may also collect information about operation of virtual machines in the infrastructure 118 that were created from the virtual machine template. In some example aspects, during the calculation of the mentioned coefficient, it is possible to take into account the operation time of the virtual machines created from the virtual machine template. It is assumed that the longer the time of continuous operation (on average, for example) of the virtual machines created from the virtual machine template, the more likely the operation of such virtual machines should not be interrupted even for a certain interval of time. The time of continuous operation of a virtual machine may be evaluated by a periodic polling of the virtual machine (for example, by establishing a connection with the virtual machine using ping utility) in order to determine its status: operational or not. Thus, in one example aspect, the time of continuous operation may be taken as being the time between the earliest polling to which an affirmative response was sent as to the operation of the virtual machine and the time of calculation of the coefficient of importance of continuous operation. Based on these considerations, in one example aspect, the coefficient of importance of continuous operation when calculated by one of the aforementioned techniques may be further multiplied by a factor characterizing the likelihood of continuation of continuous operation of the virtual machines created from the virtual machine template. In one example aspect, this factor may be calculated as the ratio between the average time of continuous operation of the virtual machines created from the virtual machine template and the average time of continuous operation of the virtual machines in the infrastructure 118.

FIG. 3 shows a detailed flow chart of an example of operation of the update analysis module 113. In some example aspects, the update analysis module 113 is configured to calculate the coefficient of criticality of updates, and also to transmit this coefficient, along with the set of software updates to which the coefficient pertains, to the update control module 115. The determination of the coefficient of criticality of updates involves an evaluation of the need to install the set of software updates as soon as possible, which set is found in the update database 114. In some example aspect, the update analysis module 113 analyzes the set of software updates, where such set of updates includes only updates for the software which is present on the virtual machine template on which such set of software updates is supposed to be installed. In one example aspect, the list of software installed on the virtual machine template is obtained by the update analysis module 113 from the template analysis module 110. When calculating the coefficient of criticality of updates, the update analysis module 113 obtains from the update database 114 the set of software updates, and also information about the set of software updates (e.g., the type(s) of each update, the version and creation time of each update, the list of vulnerabilities being removed, the level of criticality). When calculating the coefficient of criticality of updates, each characteristic of the software update (or a characteristic derived therefrom, for example, the creation time might appear as the "age" of the software update—the number of days from the moment of creation of the software update to the moment of analysis of that update) is assigned a corresponding number, characterizing the degree of influence of that characteristic (such as the type of update, the creation time) on the need to install that software update on the virtual machine template. In one example aspect, the aforementioned coefficients are calculated as follows when evaluating the software update: the "age" of the software update may be evaluated by a number equal to the product of, for example, 0.07 times the number of days from the time of creation of the software update until the time of analysis of such update; vulnerabilities removed are evaluated by the product of, for example, 1.5 times the number of vulnerabilities removed by the software update; the level of criticality may be taken into account without changes (the level of criticality originally constitutes a number); the overall type of the update may be evaluated by the sum of the numbers characterizing the possible types of software update: removal of a vulnerability—1, changing of functionality—0.8, changing of interface—0.2. In one example aspect, the update analysis module 113 calculates the coefficient of criticality of updates as the sum of the coefficients corresponding to the characteristics (e.g., the numbers characterizing the degree of influence of the particular characteristic on the need to install the software update) for each software update in the set of software updates. The coefficient of criticality of updates so calculated, with its corresponding set of software updates, is sent by the update analysis module 113 to the input to the update control module 115.

Figure 4:
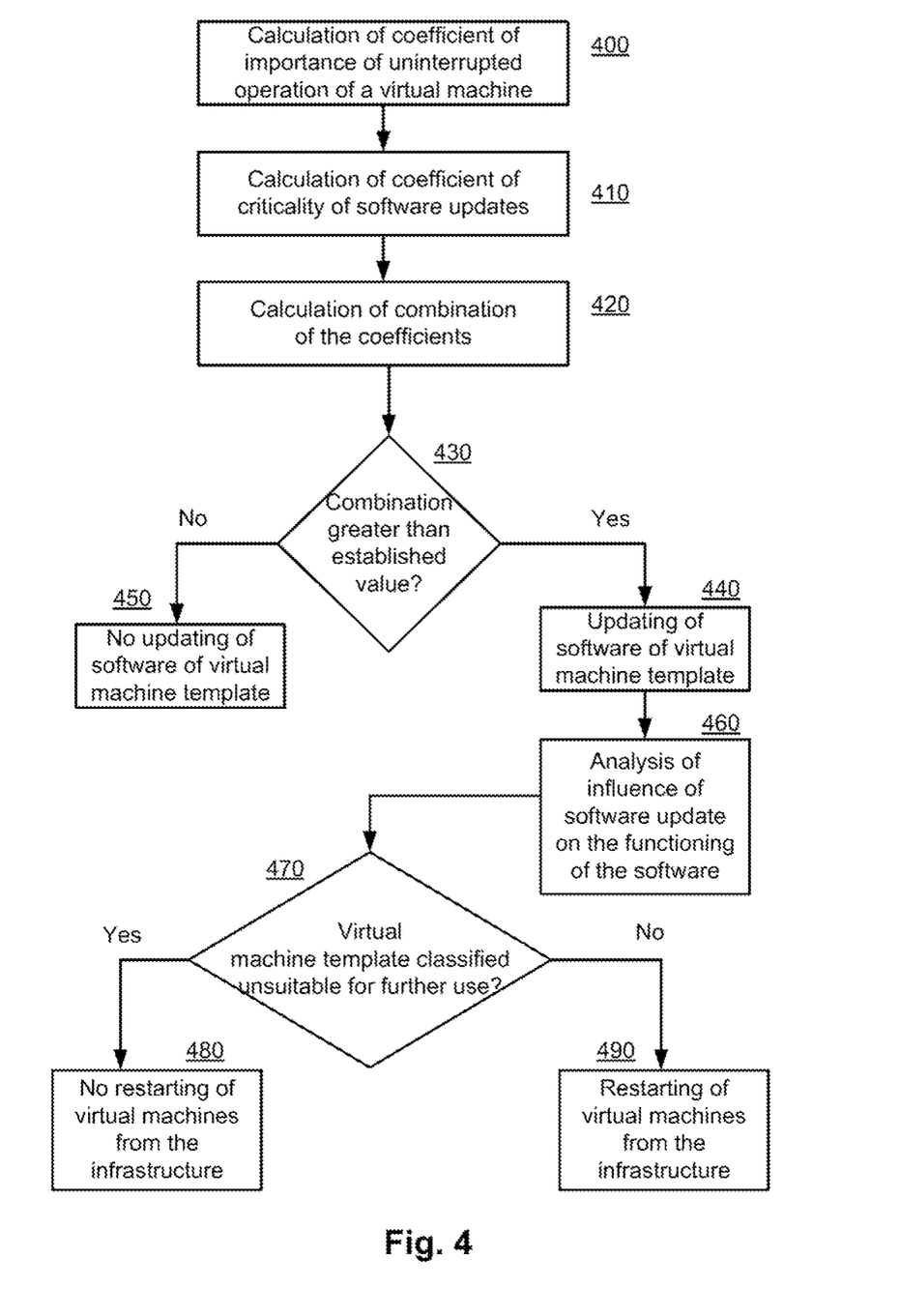
FIG. 4 is a flowchart of an example method of running a virtual machine according to one example aspect.

FIG. 4 shows a flowchart of the operating algorithm of one example aspect of the above-described system for updating software of templates of virtual machines. In step 400, the template analysis module 110 calculates the coefficient of importance of continuous operation with regard to the virtual machine template. During this calculation, data are used that are stored in the template database 112. The calculated coefficient of importance of continuous operation together with the template of the virtual machine to which that coefficient pertains goes to the input of the update control module 115. In step 410, the update analysis module 113 calculates the coefficient of criticality of updates for the set of software updates. During this calculation, data are used that are stored in the update database 114. The calculated coefficient of criticality of updates together with the set of software updates to which this coefficient pertains goes to the input of the update control module 115. The update control module 115, in step 420, calculates the combination of coefficients which said module 115 receives from the template analysis module 110 and the update analysis module 113. In step 430, the update control module 115 compares the combination of coefficients calculated in step 420 with an established value. If the combination does not exceed the established value, the software of the virtual machine template is not updated, and the system ends its work in step 450. But if the combination is greater than the established value, the virtual machine template and set of software updates obtained by the update control module 115 are sent to the template update module 116 for subsequent updating of the software of the virtual machine template in step 440. In step 460, the update testing module 117 performs an analysis of the influence of the software update in regard to the operation of the software of the template obtained in step 440 with the aid of the template update module 116. In step 470, the update testing module 117 makes a decision to classify the virtual machine template with updated software fit for further use. If the mentioned template was classified as unsuitable for further use, then in accordance with step 480 there is no restarting of the virtual machines created from the virtual machine template whose software was updated. But if the virtual machine template with updated software was not classified as unsuitable, then, in step 490, the template update module 116 reboots the virtual machines running within the infrastructure 118 that were created from the virtual machine template whose software was updated in step 440.

Figure 5:
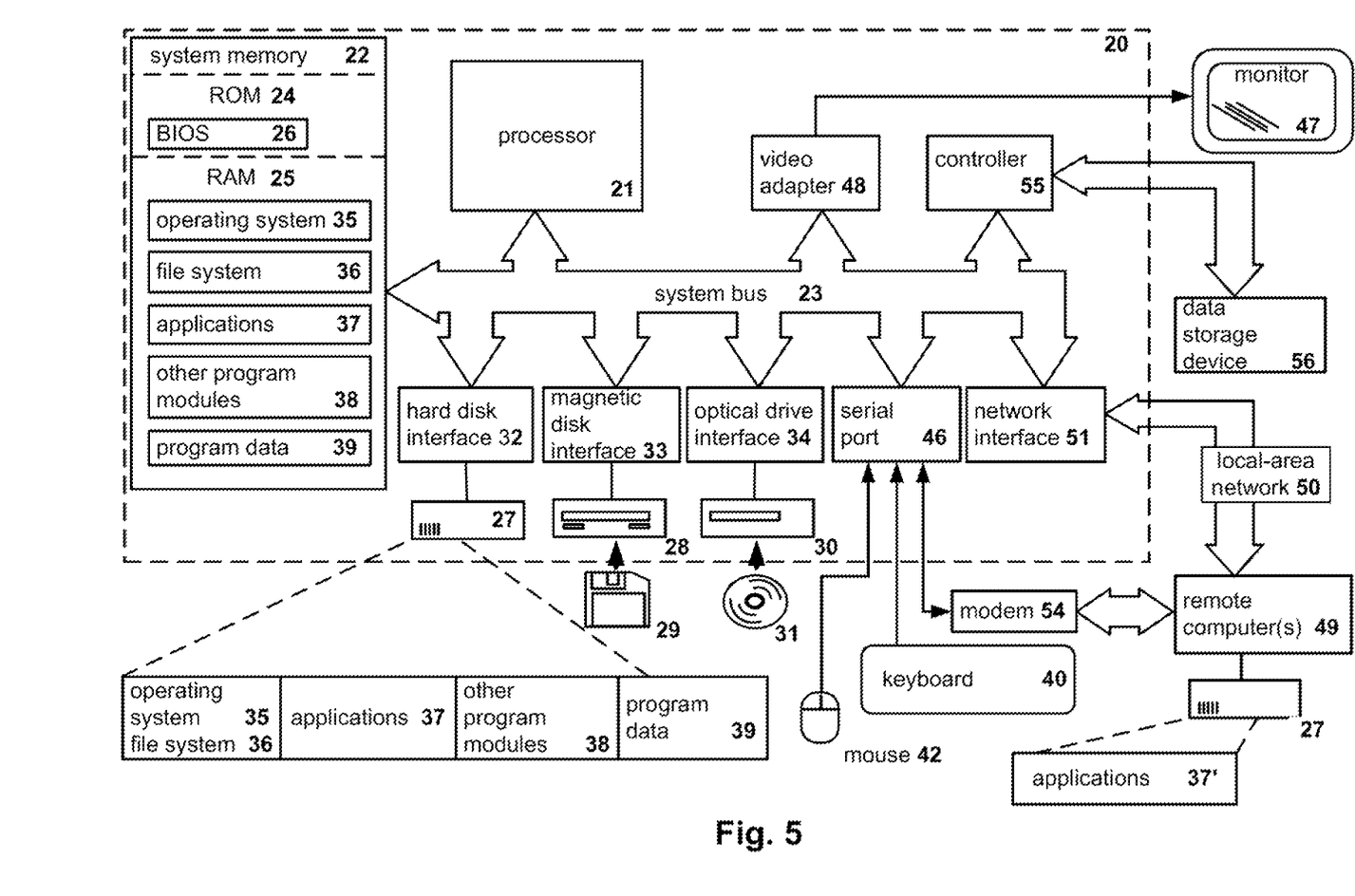
FIG. 5 shows an example of a general-purpose computer system suitable for implementing system and methods for updating software of templates of virtual machines according to various example aspects.

FIG. 5 shows an example of a general-purpose computer system (which may be a personal computer or a server) 20, which may be used to implement aspects of system and methods disclosed herein. The computer system 20 includes a central processing unit 21, a system memory 22 and a system bus 23 connecting the various system components, including the memory associated with the central processing unit 21. The system bus 23 is realized like any bus structure known from the prior art, including in turn a bus memory or bus memory controller, a peripheral bus and a local bus, which is able to interact with any other bus architecture. The system memory includes permanent memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is stored, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to work in a network environment, using a network connection to one or more remote computers 49. The remote computer (or computers) 49 are also personal computers or servers having the majority or all of the aforementioned elements in describing the nature of a personal computer 20, as shown in FIG. 4. Other devices can also be present in the computer network, such as routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 5 above). Accordingly, each module can be realized in a variety of suitable configurations, and should not be limited to any particular implementation exemplified herein.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for updating software on virtual machines, the method comprising:
   determining, by a hardware processor, a first coefficient indicative of a level of importance of a continuous operation of one or more virtual machines created from a virtual machine template;
   determining a second coefficient indicative of a level of criticality of software updates on the one or more virtual machines created from the virtual machine template;
   determining a third coefficient as a function of the first coefficient and the second coefficient;
   when the third coefficient exceeds a threshold, updating the software on the virtual machine template to generate an updated virtual machine template; and
   determining whether the updated virtual machine template is suitable for being used for one or more virtual machines by detecting events causing an incorrect execution of at least one virtual machine during a period of operating a test virtual machine created from the up virtual machine template.

2. The method of claim 1, further comprising:
   upon determining that the updated virtual machine template is suitable:
   creating a new virtual machine from the updated virtual machine template;
   shutting down the one or more virtual machines; and
   running the new virtual machine to replace the one or more virtual machines.

3. The method of claim 1, further comprising:
   providing a database of software updates storing one or more of:
   at least one software update for updating of the one or more virtual machines;
   data about a creation time of the software update;
   data about a version of the software update;
   data about software for which the software update is intended;
   data about vulnerabilities which are patched by the software update;
   data about a level of criticality of the software update; and
   data indicating a nature of changes made in the software by the update.

4. The method of claim 1, wherein the third coefficient is one of:
   a linear function of the first coefficient and the second coefficient; and
   a product of the first coefficient weighted by a first index and the second coefficient weighted by a second index.

5. The method of claim 1, wherein updating the software on the virtual machine template comprises:
   generating a dummy virtual machine based on the virtual machine template;
   applying the software update to the software of the dummy virtual machine;
   shutting down the dummy virtual machine; and
   creating an image corresponding to the dummy virtual machine.

6. The method of claim 1, wherein updating the software on the virtual machine template comprises:
   applying the software update to the software of the virtual machine template.

7. The method of claim 1, wherein determining the first coefficient comprises:
   based on a software evaluation table in which a weighting factor is established for each software program, determining weighting factors for installed software on the virtual machine template; and
   calculating the first coefficient s a function of the weighting factors.

8. The method of claim 1, wherein determining the first coefficient is performed based on a recorded length of the continuous operation of the one or more virtual machines.

9. The method of claim 1, wherein determining the second coefficient comprises:
   determining one or more characteristics of the software update and respective coefficients for the one or more characteristics; and
   determining the second coefficient as a function of the respective coefficients.

10. A system for updating software on virtual machines, the system comprising:
    a hardware processor configured to:
    determine a first coefficient indicative of a level of importance of a continuous operation of one or more virtual machines created from a virtual machine template;
    determine a second coefficient indicative of a level of criticality of software updates on the one or more virtual machines created from the virtual machine template;
    determine a third coefficient as a function of the first coefficient and the second coefficient;
    when the third coefficient exceeds a threshold, update the software on the virtual machine template to generate an updated virtual machine template; and
    determine whether the updated virtual machine template is suitable for being used for one or more virtual machines by detecting events causing an incorrect execution of at least one virtual machine during a period of operating test virtual machine created from he updated virtual machine template.

11. The system of claim 10, wherein the processor is further configured to:
    upon determining that the updated virtual machine template is suitable:
    create a new virtual machine from the updated virtual machine template;
    shut down the one or more virtual machines; and
    run the new virtual machine to replace the one or more virtual machines.

12. The system of claim 10, wherein the processor is further configured to:
    provide a database of software updates storing one or more of:
    at least one software update for updating of the one or more virtual machines;
    data about a creation time of the software update;
    data about a version of the software update;
    data about software for which the software update is intended;
    data about vulnerabilities which are patched by the software update;
    data about a level of criticality of the software update; and
    data indicating a nature of changes made in the software by the update.

13. The system of claim 10, wherein the third coefficient is one of:
    a linear function of the first coefficient and the second coefficient; and
    a product of the first coefficient weighted by a first index and the second coefficient weighted by a second index.

14. The system of claim 10, wherein the processor updates the software on the virtual machine template by:
- generating a dummy virtual machine based on the virtual machine template;
- applying the software update to the software of the dummy virtual machine;
- shutting down the dummy virtual machine; and
- creating an image corresponding to the dummy virtual machine.

15. The system of claim 10, wherein the processor updates the software on the virtual machine template by:
- applying the software update to he software of the virtual machine plate.

16. The system of claim 10, wherein the processor determines the first coefficient by:
- based on a software evaluation table in which a weighting factor is established for each software program, determining weighting factors for installed software on the virtual machine template; and
- calculating the first coefficient as a function of the weighting factors.

17. The system of claim 10, wherein the processor determines the first coefficient based on recorded lengths of the continuous operation of the one or more virtual machines.

18. The system of claim 10, wherein the processor determines the second coefficient by:
- determining one or more characteristics of the Software update and respective coefficients for the one or more characteristics; and
- determining the second coefficient as a function of he respective coefficients.

19. A computer program product stored on a non-transitory computer-readable storage medium, the computer program product comprising computer-executable instructions for causing a computing device having a hardware processor to update software on virtual machines, including instructions for:
- determining a first coefficient indicative of a level of importance of a continuous operation of one or more virtual machines created from a virtual machine template;
- determining a second coefficient indicative of a level of criticality of software updates on the one or more virtual machines created from the virtual machine template;
- determining a third coefficient as a function of the first coefficient and the second coefficient;
- when the third coefficient exceeds a threshold, updating the software on the virtual chine template to generate an updated virtual machine template; and
- determining whether the updated virtual machine template is suitable for being used for one or more virtual machines by detecting events causing an incorrect execution of at least one virtual machine during a period of operating a test virtual machine created from the updated virtual machine template.

20. The computer program product of claim 19, further comprising instructions for:
- upon determining that the updated virtual machine template is suitable:
  - creating a new virtual machine from the updated virtual machine template;
  - shutting down the one or more virtual machines; and
  - running the new virtual machine to replace the one or more virtual machines.

* * * * *